(12) United States Patent
Maruko et al.

(10) Patent No.: US 10,160,827 B2
(45) Date of Patent: Dec. 25, 2018

(54) RESIN COMPOSITION AND FLUX

(71) Applicant: Senju Metal Industry Co., Ltd., Tokyo (JP)

(72) Inventors: Daisuke Maruko, Tochigi (JP); Atsumi Takahashi, Tochigi (JP); Takayuki Yoshida, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 15/522,883

(22) PCT Filed: Oct. 14, 2015

(86) PCT No.: PCT/JP2015/079026
§ 371 (c)(1),
(2) Date: Apr. 28, 2017

(87) PCT Pub. No.: WO2016/067919
PCT Pub. Date: May 6, 2016

(65) Prior Publication Data
US 2017/0321000 A1   Nov. 9, 2017

(30) Foreign Application Priority Data

Oct. 31, 2014 (JP) ................................. 2014-223126

(51) Int. Cl.
| C08G 59/00 | (2006.01) |
| C08G 59/40 | (2006.01) |
| C08K 5/09 | (2006.01) |
| C08L 101/00 | (2006.01) |
| C08G 63/06 | (2006.01) |
| C08G 59/42 | (2006.01) |

(52) U.S. Cl.
CPC ......... *C08G 59/4028* (2013.01); *C08G 59/42* (2013.01); *C08G 59/423* (2013.01); *C08G 63/06* (2013.01); *C08K 5/09* (2013.01); *C08L 101/00* (2013.01)

(58) Field of Classification Search
None
See application file for complete search history.

(56) References Cited

U.S. PATENT DOCUMENTS

| 4,988,395 A | 1/1991 | Taguchi et al. |
| 5,177,134 A | 1/1993 | Mullen, III et al. |
| 2003/0171456 A1 | 9/2003 | Tong et al. |
| 2006/0194064 A1 | 8/2006 | Xiao et al. |
| 2014/0083567 A1* | 3/2014 | Hamagawa ............ C22C 12/00 148/24 |

FOREIGN PATENT DOCUMENTS

| JP | 6503039 A | 4/1994 |
| JP | 2646394 B2 | 5/1997 |
| JP | 107933 A | 1/1998 |
| JP | 2005519168 A | 6/2005 |
| JP | 200871779 A | 3/2008 |
| JP | 201272211 A | 4/2012 |
| JP | 201272213 | 4/2012 |
| JP | 201343931 A | 3/2013 |
| JP | 2013256584 A | 12/2013 |
| WO | 2012160722 A1 | 11/2012 |

OTHER PUBLICATIONS

Noordover et al., Co- and Terpolyesters Based on Isosorbide and Succinic Acid for Coating Applications: Synthesis and Characterization, Biomacromolecules, 2006, vol. 7, pp. 3406-3416.

* cited by examiner

*Primary Examiner* — Ana L. Woodward
(74) *Attorney, Agent, or Firm* — The Webb Law Firm

(57) ABSTRACT

A resin composition having an adhesive property in a high temperature range that is estimated during soldering, and flux using this resin composition, a flux residue of which is washable. The resin composition contains a hydroxyl carboxylic acid having two or more carboxyl groups and a hydroxyl group in its molecule and a thermosetting resin in a ratio of 1:3 or more and 1:7 or less. Further, the flux contains the hydroxyl carboxylic acid having two or more carboxyl groups and a hydroxyl group in its molecule in an amount of 8.5% by mass or more and 16% by mass or less, and a thermosetting resin in an amount of 50% by mass or more and 60% by mass or less, wherein a ratio between the hydroxyl carboxylic acid and the thermosetting resin is 1:7 or less.

5 Claims, No Drawings

RESIN COMPOSITION AND FLUX

CROSS-REFERENCE TO RELATED APPLICATIONS

This application is the United States national phase of International Application No. PCT/JP2015/079026 filed Oct. 14, 2015 and claims priority to Japanese Patent Application No. 2014-223126 filed Oct. 31, 2014, the disclosures of which are hereby incorporated in their entirety by reference.

TECHNICAL FIELD

The present invention relates to resin composition that forms a flux residue, and flux.

BACKGROUND

In association with miniaturization of information equipment, electronic components to be installed in the information equipment also have rapidly developed to be reduced in thickness thereof in recent years. In order to cope with narrowing of the connection terminal and reduction of the mounting area by any requirement of the thickness reduction, a ball grid array (hereinafter, referred to as "BGA") in which electrodes are provided on a back surface thereof has been applied to the electronic component (see, for example, Patent Document 1).

As the electronic component to which the BGA is applied is, for example, a semiconductor package is exemplified. In the semiconductor package, a semiconductor chip having electrodes is sealed with resin. On the electrodes of the semiconductor package, solder bumps are formed. Each solder bump is formed by joining a solder ball to the electrode of the semiconductor package.

In the semiconductor package to which the BGA is applied, the solder bumps are mounted on the electrodes of the substrate to which solder paste has been applied with the solder bumps being aligned and by joining the solder bumps to the electrodes through thermally melted solder paste, the semiconductor package is installed onto the substrate.

Meanwhile, a flux component contained in the solder paste contains a component that is not decomposed or evaporated by heating during soldering, and therefore, such component remains around a soldered portion as a flux residue after the soldering.

In the semiconductor package or the like to which the BGA is applied, there is a case where the flux residue needs to be removed by washing. For this reason, water-soluble flux that can be removed by washing has been proposed (see, for example, Patent Document 2).

DOCUMENTS FOR PRIOR ART

Patent Documents

Patent Document 1: Japanese Patent Application Publication No. 2008-71779
Patent Document 2: Japanese Patent No. 2646394

SUMMARY OF THE INVENTION

Problems to be Solved by the Invention

Regarding a solder alloy mainly containing Sn, a Pb-free solder alloy has a reflow peak temperature higher than that of a Pb-containing solder alloy, and therefore, a heat history applied to a substrate becomes higher.

In recent years, the semiconductor package to which the BGA is applied has been developed to be reduced in thickness thereof. In order to reduce the thickness of a semiconductor package, an incorporated module substrate needs to be reduced in thickness thereof, and further a semiconductor chip to be installed on the module substrate needs to be reduced in thickness thereof.

However, resulting in the development of reductions in the thicknesses of the semiconductor chip and the module substrate, warpage occurs during a cooling step due to a difference in thermal expansion between the module substrate and the semiconductor chip when the semiconductor chip and the module substrate are heated to high temperature, e.g., up to 250° C., for soldering during reflowing, so that stress is generated. When the heat history applied to an object to be joined becomes higher, an amount of warpage becomes larger, and therefore when the strength of solder is higher than that of the semiconductor chip, structures on the semiconductor chip start to be detached by tensile stress.

Here, a technology has been conceived to suppress the warpage of an object to be joined by utilizing a flux residue that remains at a part to be soldered when soldering.

However, conventional washable resin-based flux does not have an adhesive property in a predetermined high-temperature range expected to reach during soldering, and therefore the effect of suppressing the warpage of an object to be joined cannot be obtained. Further, flux composed of a thermosetting resin containing an underfill material is not sufficiently cured in a predetermined high-temperature range, in which the occurrence of warpage of the object to be joined can be suppressed, during a process in which the temperature is reduced in a cooling step from a heating temperature expected to reach during the soldering.

The present inventions solve such problems and have an object to provide resin composition having an adhesive property in a high-temperature range expected to reach during soldering, and flux using the resin composition.

Means for Solving the Problems

The present invention is made by finding out that resin composition obtained by mixing a hydroxyl carboxylic acid that has two or more carboxyl groups and a hydroxyl group in its molecule, in an organic acid, and a thermosetting resin in a predetermined ratio starts to be hardened from a predetermined high-temperature range in the process of temperature reduction from a temperature range corresponding to a heating temperature range during soldering and has an adhesive property.

More specifically, an invention according to clause 1 relates to resin composition containing a hydroxyl carboxylic acid having two or more carboxyl groups and a hydroxyl group in its molecule and an epoxy resin in a mass ratio of 1:3 or more and 1:7 or less wherein the epoxy resin is contained in an amount of 75% by mass or more and 87.5% by mass or less.

An invention according to clause 2 relates to flux containing a hydroxyl carboxylic acid having two or more carboxyl groups and a hydroxyl group in its molecule in an amount of 8.5% by mass or more and 16% by mass or less, and an epoxy resin in an amount of 50% by mass or more and 60% by mass or less, wherein a mass ratio between the hydroxyl carboxylic acid and the epoxy resin is 1:3.75 or more and 1:7 or less.

An invention according to clause 4 relates to the flux according to clause 2, wherein the hydroxyl carboxylic acid is any of tartaric acid, malic acid, citric acid, and hydroxymalonic acid.

An invention according to clause 6 relates to the flux according to clause 2 or 4, wherein the epoxy resin is tris-(2,3-epoxypropyl)-isocyanurate.

Effects of the Invention

According to the present inventions, the hydroxyl carboxylic acid having two or more carboxyl groups and a hydroxyl group in its molecule is used as an organic acid and the ratio between the hydroxyl carboxylic acid and the thermosetting resin is set to be 1:7 or less, so that the resin composition starts to be hardened from a predetermined high-temperature range in the process of temperature reduction from a temperature range corresponding to a heating temperature range during soldering and has an adhesive property. In the flux obtained by mixing such resin composition and a solvent component, the resin composition starts to be hardened from the predetermined high-temperature range in the process of temperature reduction from a temperature range that can be reached by heating during the soldering, so that a flux residue is formed.

Accordingly, the thermosetting resin contained in the flux is mainly cured in the process of temperature reduction from the temperature range that can be reached by heating during the soldering in the soldering step using a reflow furnace or the like, so that the flux residue can adhere to an object to be joined.

Therefore, even when the heat history applied to the object to be joined becomes high, the occurrence of warpage of the object to be joined can be suppressed. Further, the flux residue can be removed by washing when setting the ratio between the hydroxyl carboxylic acid and the thermosetting resin to be 1:3.75 or more and 1:7 or less.

EMBODIMENT FOR CARRYING OUT THE INVENTION

Resin composition obtained by mixing a hydroxyl carboxylic acid that has two or more carboxyl groups and a hydroxyl group in its molecule, among organic acids, and a thermosetting resin in a predetermined ratio starts to be hardened from a predetermined high-temperature range in the process of temperature reduction from a temperature range corresponding to a heating temperature range during soldering and has an adhesive property.

In flux obtained by mixing such resin composition and a solvent component, the resin composition starts to be hardened from a predetermined high-temperature range in the process of temperature reduction from a temperature range corresponding to a heating temperature range during soldering, so that a flux residue is formed.

The thermosetting resin is hardened at a predetermined temperature, at which the warpage of an object to be joined caused by a temperature change during heating and cooling can be suppressed, in the process of temperature reduction from a temperature that can be reached by heating during soldering, which causes the flux residue to be cured. Further, the thermosetting resin has the adhesive property to the object to be cured. Thus, the thermosetting resin contained in the flux is mainly cured, and therefore adhesion by the flux residue is performed to the object to be joined such as the electrodes of a semiconductor chip or the substrate.

The viscosity of the above-mentioned resin composition is increased in the process of temperature reduction after heating, and the hardness thereof is increased after hardening. This improves the strength of adhesion of the flux residue to the object to be joined by soldering. In addition, when it is applied for applications requiring washing, the flux residue can be removed by the washing.

Further, in the above-mentioned resin composition, when the ratio of the hydroxyl carboxylic acid to the thermosetting resin is high, the temperature at which the viscosity starts to increase becomes higher and the hardness after hardening becomes higher. On the other hand, when the ratio of the thermosetting resin to the hydroxyl carboxylic acid is high, the resin composition is not hardened in a predetermined high-temperature range and the hardness thereof becomes low. Further, when it is applied for applications requiring washing, an excessively high ratio of the hydroxyl carboxylic acid to the thermosetting resin deteriorates washability.

Therefore, the resin composition uses the hydroxyl carboxylic acid that has two or more carboxyl groups and a hydroxyl group in its molecule as the organic acid and the ratio between the hydroxyl carboxylic acid and the thermosetting resin is set to be 1:3 or more and 1:7 or less.

Further, the flux using the above-mentioned resin composition contains the hydroxyl carboxylic acid having two or more carboxyl groups and a hydroxyl group in its molecule in an amount of 8.5% by mass or more and 16% by mass or less, the thermosetting resin in an amount of 50% by mass or more and 60% by mass or less, and the remainder of a solvent component. The ratio between the hydroxyl carboxylic acid and the thermosetting resin is also set to be 1:7 or less.

In the flux, the ratio between the hydroxyl carboxylic acid and the thermosetting resin is preferably set to be 1:3.75 or more and 1:7 or less.

Further, in the flux, the hydroxyl carboxylic acid is preferably any of tartaric acid, malic acid, citric acid, and hydroxymalonic acid.

Further, in the flux, the thermosetting resin is preferably any of an epoxy resin, a phenol resin, a polyimide-based resin, a polyurethane-based resin, and an unsaturated polyester resin.

Further, in the flux, the thermosetting resin is preferably tris-(2,3-epoxypropyl)-isocyanurate.

The resin composition or the flux may contain a hardening accelerator. As the hardening accelerator, tertiary amine, imidazole, phosphine, a phosphonium salt and the like are exemplified. The hardening accelerator may be appropriately added without impairing the properties and performance of the resin composition or the flux.

EXECUTED EXAMPLES

Flux of executed examples and comparative examples was prepared to have composition shown in the following Table 1 and their adhesive properties were examined. It is to be noted that the composition in Table 1 is expressed in % by mass.

The evaluation of adhesive strength was made in the following method.

Test 1: Test for determining Hardening Temperature
(1) Preparation of Samples
First, the printings were performed on glass epoxy substrates using the flux of executed examples and comparative examples. Each of the glass epoxy substrates had a length of 37 mm, a width of 37 mm, a thickness of 1.5 mm, and a weight of 4.1±0.1 g. Further, the flux was printed to have a diameter of 6.5 mm and a thickness of 80 μm.

On each of the glass epoxy substrates on which the flux had been printed in the above manner, a chip having bumps was mounted. The chip had a length of 10 mm and a width of 10 mm, the number of bumps was 2500, each of the bumps had a diameter of 80 μm and a height of about 60 μm, and the pitch between the bumps was 150 μm.

(2) Examination Method

Each of the samples of executed examples and comparative examples prepared in the above method was mounted on a hot plate for heating and heated at 250° C. for 1 minute. After the heating, each sample was mounted on another hot plate which has been previously heated to temperatures shown in Table 1 and was kept for 1 minute. Then, the chip was picked up with tweezers and it was determined whether the glass epoxy substrate was picked up together with the chip. It is to be noted that this test was performed with the sample being mounted on the hot plate. As a result of the test, when it was picked up, the flux was evaluated as ○, but when it was not picked up, the flux was evaluated as ×.

in a predetermined ratio is not volatilized in a temperature range that can be reached by heating during soldering, that is, at 250° C. in these examples, and starts to be hardened in a predetermined high-temperature range, that is, at 150° C. or higher in these examples in the process of temperature reduction, so that a flux residue is formed, and the flux residue adheres the chip and the glass epoxy substrate together.

Further, they are in a melted state when the temperature is 250° C. without performing cooling, and therefore melting of a solder alloy is not inhibited during soldering using the flux.

On the other hand, in the comparative example 1 in which the tartaric acid was used as the hydroxyl carboxylic acid but the ratio between the hydroxyl carboxylic acid and the thermosetting resin exceeded 1:7, the glass epoxy substrate could not be picked up together with the chip in a high-temperature range of 150° C. or higher.

Further, also in the comparative examples 2 to 4 in which the amount of diglycolic acid added as an organic acid was

TABLE 1

| | Thermosetting resin | Tartaric acid | Diglycolic acid | Thermosetting resin:Organic acid | 250° C. (without cooling) | 180° C. | 170° C. | 160° C. | 150° C. | 25° C. |
|---|---|---|---|---|---|---|---|---|---|---|
| Executed Example 1 | 75 | 25 | | 3:1 | × | ○ | ○ | ○ | ○ | ○ |
| Executed Example 2 | 80 | 20 | | 4:1 | × | × | ○ | ○ | ○ | ○ |
| Executed Example 3 | 85.7 | 14.3 | | 6:1 | × | × | × | ○ | ○ | ○ |
| Executed Example 4 | 87.5 | 12.5 | | 7:1 | × | × | × | × | ○ | ○ |
| Comparative Example 1 | 90 | 10 | | 9:1 | × | × | × | × | × | ○ |
| Comparative Example 2 | 75 | | 25 | 3:1 | × | × | × | × | × | ○ |
| Comparative Example 3 | 80 | | 20 | 4:1 | × | × | × | × | × | ○ |
| Comparative Example 4 | 85.7 | | 14.3 | 6:1 | × | × | × | × | × | ○ |

In the executed examples 1 to 4, tartaric acid was used as the hydroxyl carboxylic acid, and the amount of the thermosetting resin added was adjusted so that the ratio between the tartaric acid and the thermosetting resin was 1:3 or more and 1:7 or less.

In the executed examples 1 to 4, the glass epoxy substrates were picked up together with the chips in a high-temperature range of 150° C. or higher. However, the glass epoxy substrates were not picked up together with the chips when the temperature was 250° C. without performing cooling.

Accordingly, it is understood in the composition of the executed examples 1 to 4 that the resin composition prepared by mixing the tartaric acid and the thermosetting resin 10% by mass and the amount of the thermosetting resin added was adjusted so that the ratio between diglycolic acid and the thermosetting resin was 1:3.75 or more and 1:7 or less, the glass epoxy substrates could not be picked up together with the chips in a high-temperature range of 150° C. or higher.

Then, flux of the executed examples and comparative examples was prepared to have compositions shown in the following Table 2 and the hardness and hardening temperature of the flux residues were examined. It is to be noted that the composition in Table 2 is expressed in % by mass with respect to the total mass of the flux. The tertiary amine that was liquid at ordinary temperature was used.

TABLE 2

| | Executed Example 5 | Executed Example 6 | Executed Example 7 | Executed Example 8 | Executed Example 9 | Comparative Example 5 | Comparative Example 6 |
|---|---|---|---|---|---|---|---|
| Tartaric acid | 13 | 13 | 11 | 10 | 9 | 8 | |
| Diglycolic acid | | | | | | | 13 |
| Thermosetting resin | 60 | 50 | 60 | 60 | 60 | 60 | 60 |

TABLE 2-continued

|  | Executed Example 5 | Executed Example 6 | Executed Example 7 | Executed Example 8 | Executed Example 9 | Comparative Example 5 | Comparative Example 6 |
|---|---|---|---|---|---|---|---|
| Tertiary amine | 23 | 23 | 23 | 23 | 23 | 23 | 23 |
| Solvent | 4 | 14 | 6 | 7 | 8 | 9 | 4 |
| Total | 100 | 100 | 100 | 100 | 100 | 100 | 100 |
| Tartaric acid:Thermosetting resin | 1:4.62 | 1:3.85 | 1:5.45 | 1:6.00 | 1:6.67 | 1:7.50 | 1:4.62 |
| Pencil hardness test | >7H | >7H | >7H | 7H | 6H | 5H | B |
| Test for determining hardening temperature | ○ | ○ | ○ | ○ | ○ | x | x |

Test 2: Pencil Hardness Test

The hardness of a flux residue was evaluated by a pencil hardness test (JIS K5400). The test method was as follows: The samples were prepared by performing the printing on the test substrates using flux of the executed examples and comparative examples each having a thickness of 0.15 mm, and the samples were subjected to reflowing. The reflowing condition was set so that a temperature rise rate was 1.46° C./sec (30 to 250° C.), a peak temperature was 249° C., the samples were kept at 217° C. or higher for 116 sec., a temperature decrease rate was 1.0° C./sec, and an oxygen concentration was 100 ppm. A test for determining a hardening temperature was performed in the same manner as in the above-described test 1. That is, when a flux residue was set at 150° C., the flux was evaluated as ○.

In the executed examples 5 to 9 in which the tartaric acid was used as the hydroxyl carboxylic acid, and the amounts of the tartaric acid and the thermosetting resin added were adjusted so that the ratio between the tartaric acid and the thermosetting resin was 1:3.75 or more and 1:7 or less, a flux residue was cured at 150° C. and had hardness of 6H or higher.

On the other hand, in the comparative example 5 in which the tartaric acid was used as the hydroxyl carboxylic acid but the ratio between the tartaric acid and the thermosetting resin exceeded 1:7 and the comparative example 6 in which diglycolic acid was used instead of the tartaric acid, a flux residue was not cured at 150° C. and did not have hardness of 6H or higher.

Then, flux of the executed examples and comparative examples was prepared to have compositions shown in the following Table 3 and the washability of flux residue was examined. It is to be noted that the composition in Table 3 is expressed in % by mass with respect to the total mass of the flux.

TABLE 3

|  | Executed Example 10 | Executed Example 11 | Executed Example 12 | Comparative Example 7 |
|---|---|---|---|---|
| Tartaric acid | 13 | 14 | 15 | 17 |
| Thermosetting resin | 60 | 60 | 60 | 60 |
| Amine | 23 | 23 | 23 | 22 |
| Solvent | 4 | 3 | 2 | 1 |
| Total | 100 | 100 | 100 | 100 |
| Tartaric acid:Thermosetting resin | 1:4.62 | 1:4.29 | 1:4.00 | 1:3.53 |
| Washability | ○ | ○ | ○ | x |

Test 3: Washing Test

The test method was as follows: The samples were prepared by performing the printing on copper plates using the flux of the executed examples and comparative examples each having a thickness of 0.2 mm and the samples were subjected to reflowing. The reflowing condition was set so that a peak temperature was 245° C., the samples were kept at 220° C. or higher for 40 sec., and a nitrogen concentration was 500 ppm or less. After the reflowing, the samples were subjected to ultrasonic washing using water for 1 minute and then to air blowing. Then, each of the samples was visually observed to determine whether a flux residue was left. When the flux residue could be removed, the washability of flux residue was evaluated as ○.

In the executed examples 10 to 12 in which the tartaric acid was used as the hydroxyl carboxylic acid and the amounts of the tartaric acid and the thermosetting resin added were prepared so that the ratio between the tartaric acid and the thermosetting resin was 1:3.75 or more, flux residues could be removed by washing with water.

On the other hand, in the comparative example 7 in which the tartaric acid was used as the hydroxyl carboxylic acid but the ratio between the tartaric acid and the thermosetting resin was less than 1:3.75, a flux residue could not be removed by washing with water.

It has been understood from the above results that in the resin composition in which the hydroxyl carboxylic acid having two or more carboxyl groups and a hydroxyl group in its molecule is used as an organic acid and ratio of the hydroxyl carboxylic acid and the thermosetting resin is 1:7 or less and the flux using this resin composition, the resin composition is not volatilized in a temperature range that can be reached by heating during soldering, and starts to be hardened in a predetermined high-temperature range in the process of temperature reduction, so that a flux residue is formed.

Accordingly, the thermosetting resin contained in the flux is mainly cured in the process of temperature reduction from a temperature range that can be reached by heating during soldering in the soldering step using a reflow furnace or the like, and therefore the flux residue adheres an object to be joined such as a semiconductor chip to the substrate.

Therefore, it has been understood that even when the heat history applied to the substrate becomes high due to an increase in reflow peak temperature caused by the use of a Pb-free solder alloy, the occurrence of warpage of the substrate can be suppressed.

Further, it has been understood that when the ratio between the hydroxyl carboxylic acid and the thermosetting resin is about 1:3, the resin composition starts to be hardened from a high-temperature range of about 180° C. Therefore, when it is used for an application which is not necessary to take the washability of flux residue into consideration, the ratio between the hydroxyl carboxylic acid and the thermosetting resin is preferably set to be 1:3 or more and 1:7 or less.

On the other hand, it has been understood that even when the ratio between the hydroxyl carboxylic acid and the thermosetting resin is about 1:4, the resin composition starts to be hardened in a high-temperature range of about 170° C. However, when the ratio between the hydroxyl carboxylic acid and the thermosetting resin is about 1:3.5, the washability of flux residue is poor. Therefore, when it is used for an application which is necessary to take the washability of flux residue into consideration, the ratio between the hydroxyl carboxylic acid and the thermosetting resin is preferably set to be 1:3.75 or more and 1:7 or less.

INDUSTRIAL APPLICABILITY

The present invention is applicable not only to a semiconductor package to which BGA is applied, but also to a substrate that is thin and is therefore likely to warp.

The invention claimed is:

1. A resin composition, consisting of: a hydroxyl carboxylic acid having two or more carboxyl groups and a hydroxyl group in its molecule; and an epoxy resin in a mass ratio of 1:3 through 1:7, wherein the epoxy resin is contained in an amount of 75% by mass through 87.5% by mass based on the total mass of the resin composition.

2. A flux, consisting of: a hydroxyl carboxylic acid having two or more carboxyl groups and a hydroxyl group in its molecule in an amount of 8.5% by mass through 16% by mass based on the total mass of the flux; an epoxy resin in an amount of 50% by mass through 60% by mass based on the total mass of the flux; a hardening accelerator; and a solvent, wherein a mass ratio between the hydroxyl carboxylic acid and the epoxy resin is 1:3.75 through 1:7.

3. The flux according to claim 2, wherein the hydroxyl carboxylic acid is any of tartaric acid, malic acid, citric acid and hydroxymalonic acid.

4. The flux according to claim 3, wherein the epoxy resin is tris-(2,3-epoxypropyl)-isocyanurate.

5. The flux according to claim 2, wherein the epoxy resin is tris-(2,3-epoxypropyl)-isocyanurate.

* * * * *